(12) United States Patent
Mahgerefteh et al.

(10) Patent No.: US 7,813,648 B2
(45) Date of Patent: Oct. 12, 2010

(54) METHOD AND APPARATUS FOR COMPENSATING FOR FIBER NONLINEARITY IN A TRANSMISSION SYSTEM

(75) Inventors: Daniel Mahgerefteh, Palo Alto, CA (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 244 days.

(21) Appl. No.: 12/187,151

(22) Filed: Aug. 6, 2008

(65) Prior Publication Data

US 2009/0016740 A1 Jan. 15, 2009

Related U.S. Application Data

(63) Continuation-in-part of application No. 10/308,522, filed on Dec. 3, 2002, and a continuation-in-part of application No. 11/037,718, filed on Jan. 18, 2005, now Pat. No. 7,536,113, and a continuation-in-part of application No. 11/068,032, filed on Feb. 28, 2005, now Pat. No. 7,555,225, and a continuation-in-part of application No. 11/084,630, filed on Mar. 18, 2005, now Pat. No. 7,406,266, and a continuation-in-part of application No. 11/093,461, filed on Mar. 30, 2005, now Pat. No. 7,558,488, and a continuation-in-part of application No. 11/272,100, filed on Nov. 8, 2005, now Pat. No. 7,477,851, and a continuation-in-part of application No. 11/702,436, filed on Feb. 5, 2007, now Pat. No. 7,502,532, and a continuation-in-part of application No. 11/784,411, filed on Apr. 6, 2007, now Pat. No. 7,542,683.

(60) Provisional application No. 60/963,707, filed on Aug. 7, 2007.

(51) Int. Cl.
H04B 10/18 (2006.01)
(52) U.S. Cl. .................. 398/158; 398/187; 398/201
(58) Field of Classification Search ............... 398/158, 398/185–187, 201, 212
See application file for complete search history.

(56) References Cited

U.S. PATENT DOCUMENTS 3,324,295 A 6/1967 Harris
(Continued)

FOREIGN PATENT DOCUMENTS

GB 2 107 147 4/1983
(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.
(Continued)

*Primary Examiner*—Leslie Pascal
(74) *Attorney, Agent, or Firm*—Workman Nydegger (57) ABSTRACT

A transmitter includes a frequency modulated laser. An optical spectrum reshaper (OSR) is positioned to receive the frequency modulated signal and has a transmission function effective to convert the frequency modulation to amplitude modulation. An optical fiber channel has a first end positioned to receive the filtered signal and a second end proximate a receiver. A filter is positioned between the second end and the receiver and has a peak transmission frequency thereof located on a transmission edge of the OSR, such as at a peak logarithmic derivative value of the transmission function of the optical spectrum reshaper. In some embodiments a first OSR is positioned to receive the frequency modulated signal and configure to output a filtered signal wherein high frequency portions are more attenuated than low frequency portions. A second OSR at the receiver attenuates the low frequency portions substantially more than the high frequency portions.

20 Claims, 6 Drawing Sheets

U.S. PATENT DOCUMENTS

| | | |
|---|---|---|
| 3,999,105 A | 12/1976 | Archey et al. |
| 4,038,600 A | 7/1977 | Thomas et al. |
| 4,561,119 A | 12/1985 | Epworth |
| 4,805,235 A | 2/1989 | Henmi |
| 4,841,519 A | 6/1989 | Nishio |
| 5,293,545 A | 3/1994 | Huber |
| 5,325,378 A | 6/1994 | Zorabedian |
| 5,371,625 A | 12/1994 | Wedding et al. |
| 5,412,474 A | 5/1995 | Reasenberg et al. |
| 5,416,629 A | 5/1995 | Huber |
| 5,465,264 A | 11/1995 | Buhler et al. |
| 5,477,368 A | 12/1995 | Eskildsen et al. |
| 5,550,667 A | 8/1996 | Krimmel et al. |
| 5,592,327 A | 1/1997 | Gabl et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 | 10/2002 | Roberts et al. |
| 6,506,342 B1 | 1/2003 | Frankel |
| 6,563,623 B1 | 5/2003 | Penninckx et al. |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg et al. |
| 6,687,278 B1 | 2/2004 | Mason et al. |
| 6,748,133 B2 | 6/2004 | Liu et al. |
| 6,778,307 B2 | 8/2004 | Clark |
| 6,810,047 B2 | 10/2004 | Oh et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAl As Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

(a) OSR at Tx side          (b) OSR at Rx side

METHOD AND APPARATUS FOR COMPENSATING FOR FIBER NONLINEARITY IN A TRANSMISSION SYSTEM

CROSS-REFERENCE TO RELATED APPLICATIONS

This application claims the benefit of U.S. Provisional Application Ser. No. 60/963,707 filed Aug. 7, 2007.

This application is a continuation-in-part of U.S. application Ser. No. 10/308,522 filed Dec. 3, 2002; U.S. application Ser. No. 11/037,718 filed Jan. 18, 2005; U.S. application Ser. No. 11/068,032 filed Feb. 28, 2005; U.S. application Ser. No. 11/084,630 filed Mar. 18, 2005; U.S. application Ser. No. 11/093,461 filed Mar. 30, 2005; U.S. application Ser. No. 11/272,100 filed Nov. 8, 2005; U.S. application Ser. No. 11/702,436 filed Feb. 5, 2007; and U.S. application Ser. No. 11/784,411 filed Apr. 6, 2007.

BACKGROUND OF THE INVENTION

1. The Field of the Invention

This application relates to optical transmitters and, more particularly, to systems and methods for reducing errors caused by nonlinear effects experienced by signals during transmission through optical fiber.

2. The Relevant Technology

In long haul dense wavelength division multiplex (DWDM) transmission systems, dispersion tolerance and high optical signal to noise ratio (OSNR) are two key parameters. Normally, the two requirements are contradicted. On one hand, the power in a WDM transmission system needs to be controlled within a certain level to reduce nonlinear effects for wider dispersion tolerance and better performance; on the other hand, systems need high power for high optical signal to noise ratio (OSNR). The nonlinear effects include self phase modulation (SPM), cross phase modulation (XPM) and four waves mixing (FWM), stimulated Brillouin scattering (SBS), and stimulated Raman scattering (SRS).

In most long haul DWDM transmission systems, optical signal is intensity modulated. Amplitude of "1" bits and "0" bits is different. Since nonlinear effects relate to optical power, "1" bits and "0" bits have different nonlinear effects. For example, longer "1" patterns have different nonlinear effects compared to short "1" pattern. Nonlinear effects, such as SPM and XPM, give more penalty if dispersion is present. Furthermore, it cannot be compensated by dispersion compensation fiber. Generally speaking, the dispersion tolerance of WDM systems is reduced due to nonlinearities.

Different methods have been proposed to improve dispersion tolerance by reducing nonlinear effects and OSNR performance, such as distributed Raman amplifiers, return-to-zero (RZ) transmission format, and differential phase shift key (DPSK) format. Meanwhile, in all of the above methods, the dispersion map of the fiber should be carefully designed.

In order to achieve wider dispersion tolerance in a WDM system, higher tolerance to nonlinear effects and good OSNR performance are needed. None of the =existing methods can realize the above features simultaneously without requiring complicated system design. For example, DPSK can improve tolerance to nonlinear effects, but it does little to improve dispersion tolerance. A distributed Raman amplifier, can improve dispersion tolerance, but not tolerance to nonlinear effects; For optical duobinary signal, in linear case, the dispersion tolerance can reach +/−3000 ps/nm, but in presence of nonlinear effects its tolerance to dispersion is greatly reduced.

Compensation for nonlinear effects using electronic dispersion compensation (EDC) is also difficult. Use of the RZ format can improve a system's OSNR performance, but the dispersion tolerance is reduced.

In view of the foregoing it would be an advancement in the art to provide a simple and cost-effective system that effectively reduces errors due both to dispersion and nonlinear effects.

BRIEF SUMMARY OF THE INVENTION

In one aspect of the invention, a laser is electrically coupled to the digital data source and configured to output a frequency modulated signal encoding an output of the digital data source. An optical spectrum reshaper is positioned to receive the frequency modulated signal and has a transmission function effective to convert the frequency modulated signal to a filtered signal having lower bandwidth and higher amplitude modulation than the frequency modulated signal. An optical fiber channel has a first end positioned to receive the filtered signal and a second end proximate a receiver. A filter is positioned between the second end and the receiver, the filter having a peak transmission frequency thereof located on a transmission edge of the optical spectrum reshaper.

In another aspect of the invention, the filter has a peak transmission frequency located proximate a peak logarithmic derivative value of the transmission function of the optical spectrum reshaper.

In another aspect of the invention, the filter has a bandwidth equal or less than a bit rate of the output of the digital data source.

In another aspect of the invention a laser is electrically coupled to the digital data source and configured to output a frequency modulated signal encoding an output of the digital data source. The frequency modulated signal includes high frequency portions and low frequency portions encoding data symbols, the high frequency portions having higher amplitude than the low frequency portions. A first optical spectrum reshaper is positioned to receive the frequency modulated signal and configure to output a filtered signal. The first optical spectrum reshaper has a transmission function effective to attenuate the high frequency portions more than the low frequency portions. An optical fiber has a first end positioned to receive the filtered signal and a second end proximate an optical receiver. A second optical spectrum reshaper is positioned optically between the second end and the receiver and has a transmission function effective to attenuate the low frequency portions more than the high frequency portions.

In another aspect of the invention, the optical transmitter of claim 6, wherein the transmission function of the first optical spectrum reshaper is effective to attenuate the high frequency portions relative to the low frequency portions such that an amplitude of the high frequency portions is not less than that of the low frequency portions.

In another aspect of the invention the transmission function of the first optical spectrum reshaper is effective to attenuate the high frequency portions between 0.1 and 3 dB, preferably between 0.5 and 2 dB, more than the low frequency portions whereas the transmission function of the second optical spectrum reshaper is effective to attenuate the low frequency portions more than 5 dB, preferably between 5 and 10 dB, more than the high frequency portions.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
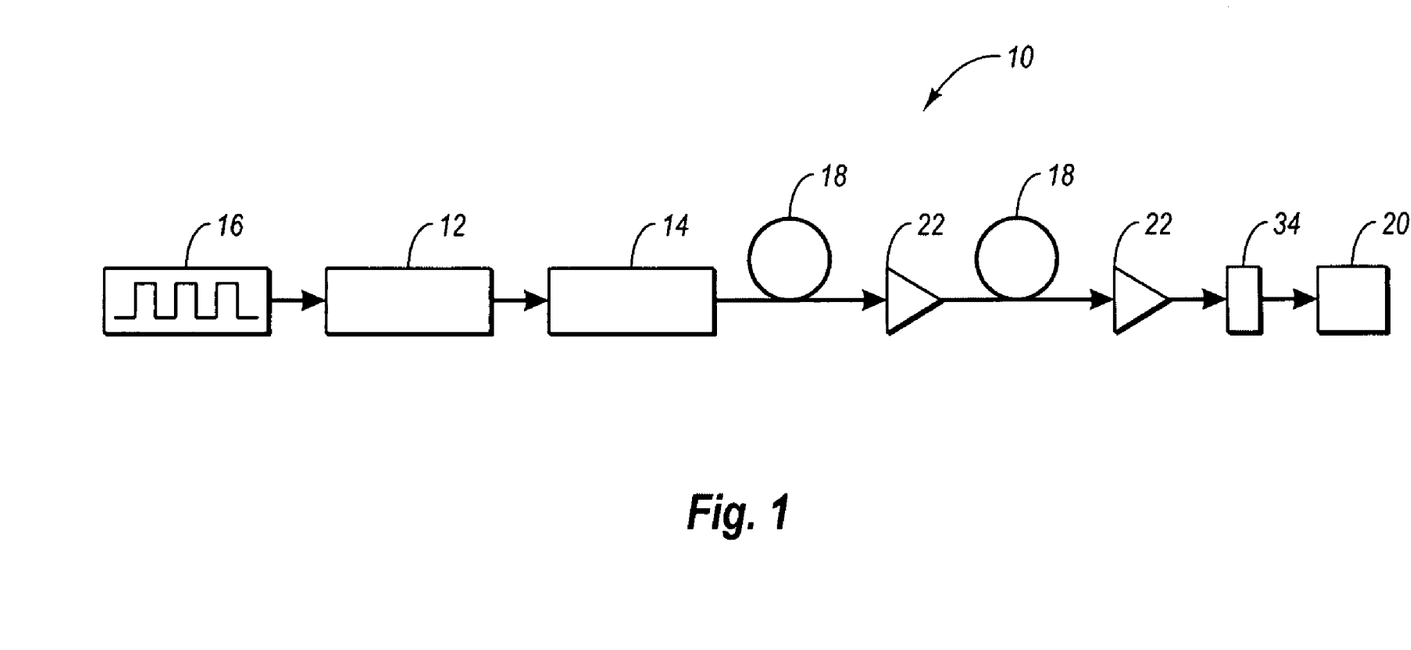
FIG. 1 is a schematic block diagram of a laser transmitter in accordance with an embodiment of the present invention.

Referring to FIG. 1, an optical communication system 10 includes a laser 12 that emits a frequency modulated signal that is received by an optical spectrum reshaper (OSR) 14. The frequency modulated signal encodes data from a data source 16 electrically coupled to the laser 12. The output of the OSR 14 is coupled to an optical fiber 18 that transmits the output to an optical receiver 20. In some embodiments, one or more intermediate amplifiers 22, such as erbium doped fiber amplifiers (EDFA) may be used to amplify the transmitted signal.

In some embodiments, the output of the laser 12 is both frequency and amplitude modulated, such as adiabatically chirped pulses produced by a directly modulated laser 12 embodied as a distributed feedback (DFB) laser, distributed Bragg reflector (DBR) laser, or other semiconductor laser. The output of the OSR 14 may also remain somewhat frequency modulated.

The OSR 14 may be embodied as one or more filters, including, but not limited to, a single cavity filter, coupled multi-cavity (CMC) filter, a thin film coupled multi-cavity filter, a periodic multi-cavity etalon, a fiber Bragg grating, a ring resonator filter, or any other optical element having a wavelength-dependent loss. The OSR 14 may also comprise a fiber, a Gire-Tournois interferometer, or some other element with chromatic dispersion. The OSR 14 may be fabricated as a solid optical element or may include gas-filled gaps, such as an OSR 14 embodied as a periodic multi-cavity etalon. In such embodiments, xenon, or other gas may be present in the gas-filled gaps.

The OSR 14 may include one or more attributes of the OSR described in U.S. application Ser. No. 10/308,522 filed Dec. 3, 2002; U.S. application Ser. No. 11/037,718 filed Jan. 18, 2005; U.S. application Ser. No. 11/068,032 filed Feb. 28, 2005; U.S. application Ser. No. 11/084,630 filed Mar. 18, 2005; U.S. application Ser. No. 11/093,461 filed Mar. 30, 2005; U.S. application Ser. No. 11/702,436 filed Feb. 5, 2007; and U.S. application Ser. No. 11/784,411 filed Apr. 6, 2007.

The transmitters in the above referenced Applications provide high tolerance to dispersion and are therefore well suited for long haul applications. As noted above, the presence of nonlinear effects in the optical fiber significantly degrade the performance of transmitters in long haul applications. Accordingly, embodiments described hereinbelow reduce the effects of such nonlinear effects while still providing high dispersion tolerance.

The digital data source 16 may include means for changing the duty cycle of the input digital signal before applying it to the laser 12. The OSR 14 can change the duty cycle of the input optical signal from the laser 12 as well. Changing the duty cycle will cause a corresponding change in the crossing point in an eye diagram, i.e., the amplitude level where the rising and falling edges of the pulses intersect. The crossing point is in the middle of the eye (between the 1 and 0 levels) when the duty cycle is 50%. The crossing point moves below the middle for duty cycle below 50%. It is therefore an embodiment of the present invention that the crossing point (or duty cycle) of the electrical signal modulating the laser be adjusted to obtain the desired crossing (or duty cycle) at the optical output of the transmitter after the OSR 14.

Figure 2:
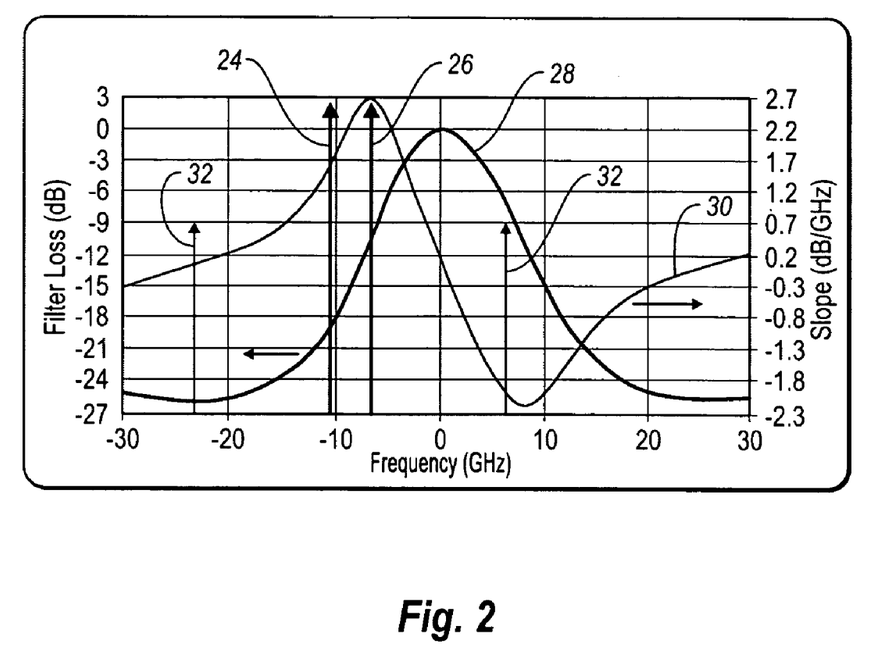
FIG. 2 is a plot of the transmission function of an optical spectrum reshaper relative to characteristic frequencies of a frequency modulated signal in accordance with an embodiment of the present invention.

Referring to FIG. 2, the output of the laser 12 may include low frequency portions and high frequency portions encoding binary ones and zeros, respectively. The low frequency portions and high frequency portions may define center frequencies 24 and 26, respectively. For purposes of this disclosure the one frequency refers to the center frequency (i.e. the frequency during a bit having the greatest optical energy) of the one bits whereas the zero frequency refers to the center frequency of the zero bits.

The center frequency 26 is preferably located at a point on the transmission function 28 of the OSR 14 that has greater transmission than the location of the center frequency 24. In some embodiments, the center frequency 26 of the one bit is located proximate a peak of the logarithmic derivative 30 of the transmission function 28.

In the embodiment of FIG. 2, the OSR 14 is a non-Gaussian shape bandpass filter. As is apparent in FIG. 2, the derivative is not linear on the dB scale, indicating that the OSR 14 has a non-Gaussian spectral profile. A Gaussian OSR would have a linear slope as a function of frequency. FIG. 2 also shows the position of the clock frequency components 32 of the input FM signal, which are reduced substantially after the OSR. This will In turn reduce the clock frequency components in the RF spectrum of the resulting second signal after the OSR. In this example, the peak slope is 2.7 dB/GHz.

Referring to FIG. 3, while referring again to FIG. 1, a narrowband optical bandpass filter 34 may be positioned between the optical fiber 18 and the receiver 20. The optical filter 34 may have a bandwidth (such as a 3 dB bandwidth) that approximates the bit rate of the output of the data source 16. For example it may be between about 0.8 and 1.5 times the bit rate. For example, the 3 dB bandwidth for the filter 34 may be between about 8 and 15 GHz for a 10 Gb/s signal.

Figure 3:
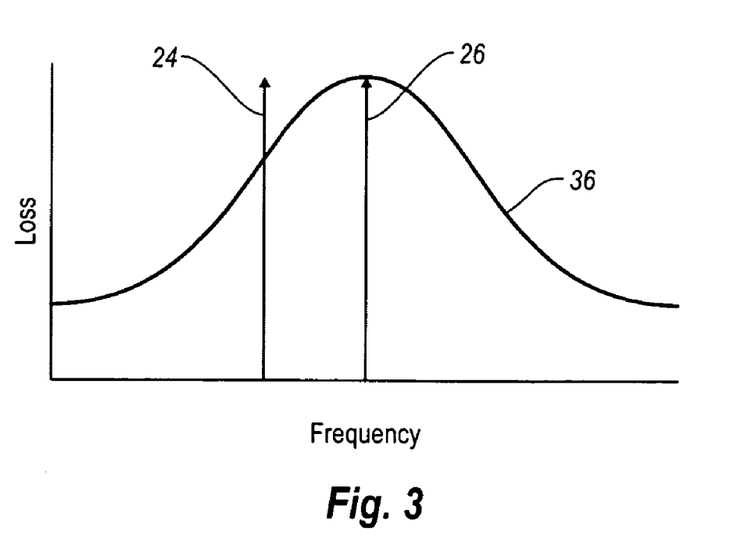
FIG. 3 is a plot of the transmission function of a bandpass filter for use in the transmitter of FIG. 1 in accordance with an embodiment of the present invention.

In the illustrated embodiment, the transmission function 36 of the optical bandpass filter 34 has a transmission peak red shifted relative to the transmission peak of the OSR 14. For example, the optical bandpass filter 34 may have a transmission peak located proximate the center frequency 26 (e.g. within +/−10% or +/−5% of the center frequency) of the one bits. The transmission peak of the filter 34 may be located on a transmission edge of the OSR 14 and may also be located proximate a local maximum (e.g. within +/−10% or +/−5% of the local maximum) in the logarithmic derivative of the transmission function 30 of the OSR 14.

In an embodiment of the present invention, a return-to-zero (RZ) signal is used to modulate the laser 12 in combination with the narrowband optical filter 34 in order to further narrow the bandwidth of the signal. This bandwidth reduction may be accomplished by achieving a π phase relationship between adjacent 1 bits. Also, due to the π phase relationship and intra-symbol interference, an RZ signal generated using the transmitter of FIG. 1 also has high dispersion tolerance. By controlling the adiabatic chirp of the output of the RZ output of the laser 12, a carrier suppressed and spectrum narrowed RZ signal can be realized. For example, for a 10 Gb/s RZ signal with 50% duty cycle, the required chirp for narrowest spectrum is 10 GHz. The following relationship should be satisfied in order to obtain the narrowest spectrum:

$$2\pi * \text{AdiabaticChirp} \times T \times \text{DutyCycle} = \pi, \quad (1)$$

where T is the period or bit rate of the optical signal.

Because of the phase relationship between pulses and the narrowed spectrum of RZ signals generated according to the transmitter of FIG. 1, the narrowband optical bandpass filter 34 can be used before the optical receiver 20 to suppress optical noise, such as that caused by nonlinear effects without causing much degradation from inter symbol interference (ISI). In a long haul DWDM system, the illustrated transmitter can improve system dispersion tolerance, while providing higher OSNR performance, due to the RZ format and the bandpass filter 34.

Figure 4:
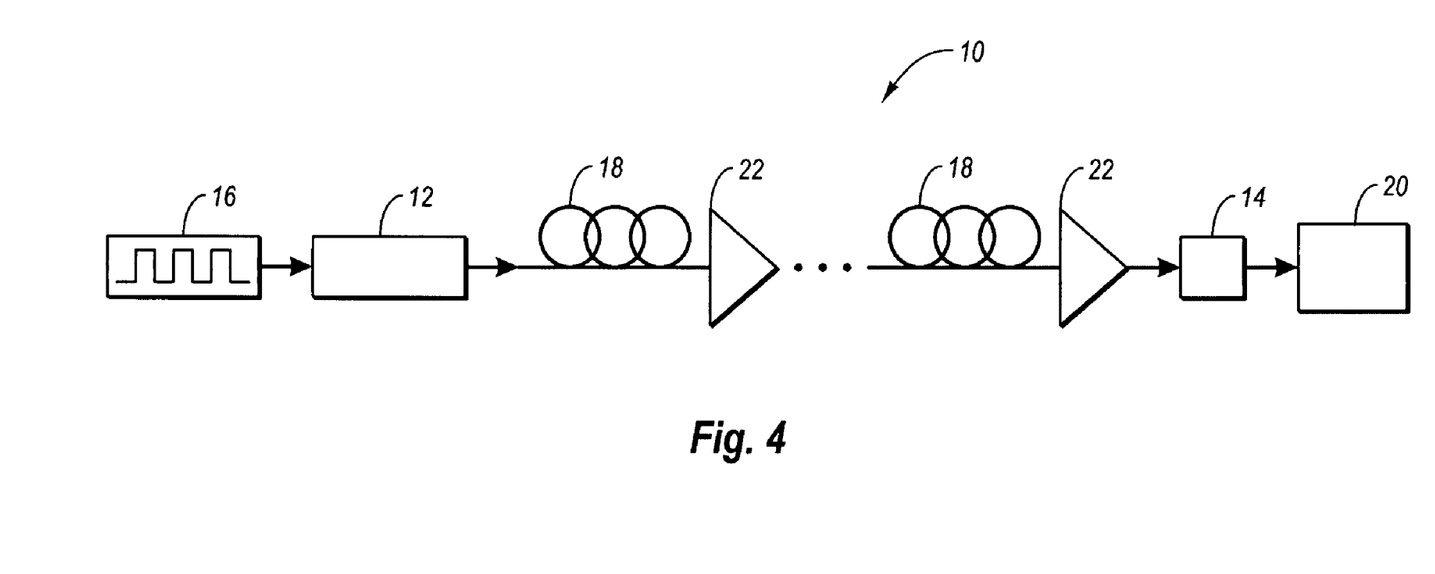
FIG. 4 is a schematic block diagram of an alternative embodiment of a laser transmitter in accordance with an embodiment of the present invention.

Referring to FIG. 4, in an alternative embodiment an optical communication system 10 includes a laser 12, such as a distributed feedback (DFB) laser, distributed Bragg reflector (DBR) laser, or other semiconductor laser, that emits a frequency modulated signal. The frequency modulated signal is coupled to an optical fiber 18 that transmits the frequency modulated output to an optical receiver 20. In some embodiments, one or more intermediate amplifiers 22, such as erbium doped fiber amplifiers (EDFA), may be used to amplify the transmitted signal.

In the embodiment of FIG. 4, the OSR 14 is positioned between the optical fiber 18 and the receiver 20. The OSR 14 may have some or all of the attributes of the OSR 14 of the embodiment of FIG. 1. The optical signal transmitted in the fiber 18 may be in the NRZ or RZ format. In a preferred embodiment the amplitude modulation depth of the signal transmitted through the fiber 18 is much smaller than for a typical RZ or NRZ signal. The laser 12 may be biased high above threshold and modulated with a digital electrical signal to produce a small (1 to 3 dB) extinction ratio amplitude modulated signal. The signal will also be frequency modulated and will have an adiabatic chirp associated with it. In one embodiment the adiabatic chirp is chosen to be about (e.g., within +/−10% of) an odd half integer multiple of the bit rate frequency. For example, the adiabatic chirp may be about equal to 5 GHz for a 10 Gb/s signal with 100% duty cycle. The chirp may have a value effective to make the product of the zero bit duration and the chirp to be between π/2 and 3π/2, preferably about equal to π (e.g., within +/−10%).

In one embodiment the optical signal is spectrally aligned with the transmission edge of the OSR 14. For example, the frequency modulated output of the laser 12 may encode data using one and zero frequencies aligned with respect to a transmission function of the OSR such that the zero frequency is substantially more attenuated than the one frequency. In some embodiments, the OSR 14 may have a transmission function with respect to the frequency modulated output of the laser 12 the same as the OSR 14 described above with respect to FIG. 2.

The slope of the OSR 14 may be high enough to generate enough conversion of frequency modulation to amplitude modulation. In addition, the slope of the OSR 14 may be chosen such that it converts adiabatic chirp from the laser to flat top chirp, as described in U.S. patent application Ser. No. 11/084,630, incorporated herein by reference. In one example, the peak slope of the OSR filter at the operating point is 2.8 dB/GHz. In some embodiments, good performance at different dispersion values may be achieved by choosing a chirp value, defined as the difference between the zero frequency and one frequency, equal to between 0.6 to 1.3 times the bandwidth of the OSR.

In some embodiments, the bandwidth of the OSR 14 is between 0.5 and two times the bit rate as discussed in U.S. patent application Ser. No. 11/037,718. The chirp value preferably also relates to the bit rate. For example, for an NRZ signal it may be between 0.3 times to 0.8 times the bit rate. For RZ signals the chirp value should satisfy Equation (1). The slope of slope of the OSR 14 may be equal to between 0.3 and 0.65 dB/GHz$^2$. The slope of slope is defined as the ratio of the peak logarithmic derivative of the transmission function of the OSR 14 to the frequency offset of this peak from the transmission peak (in GHz).

The filter bandwidth, slope and shape may be effective to generate an optical signal with high degree of dispersion tolerance as described in U.S. patent application Ser. Nos. 11/068,032 and 11/784,411, which are incorporated herein by reference. For example, the one frequency of the frequency modulated signal may experience dispersion $D_d$ in the OSR 14 and dispersion $D_f$ within the fiber 20, where $D_f$ has a sign opposite $D_d$. In some embodiments, binary ones in the frequency modulated signal output by the laser 12 experience dispersion in the OSR 14 having a sign opposite that experienced by the binary zeros in the frequency modulated signal as described in U.S. patent application Ser. No. 11/068,032.

Figure 5:
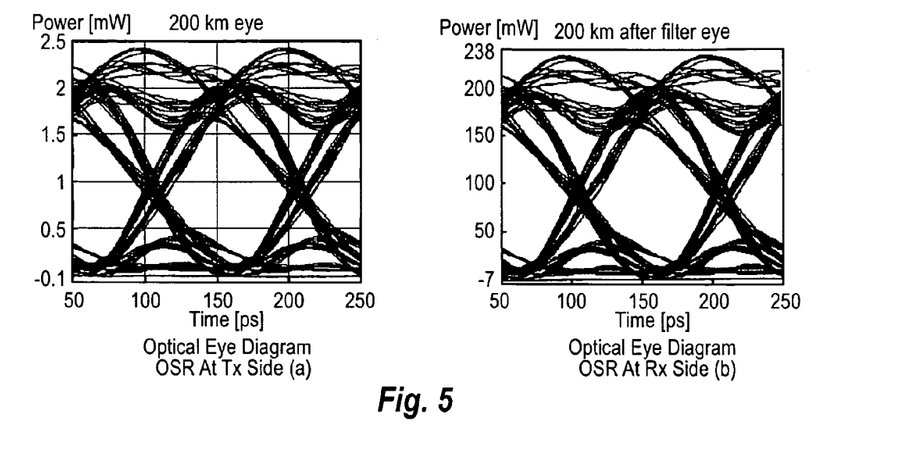
FIG. 5 is a data eye plot of signals generated using a transmitter in accordance with the embodiment of FIG. 4.

Referring to FIG. 5, simulations show the location of the OSR 14 in the system does not significantly affect performance. Provided the system is "nearly" linear, the high dispersion tolerance character will be the same. Most long haul transmission systems that use the NRZ format are designed to have low nonlinearity, and are therefore "nearly linear."

FIG. 5 shows calculated optical eye diagrams of a directly modulated DFB laser source after propagation through 200 km of standard fiber with the OSR 14 on the transmitter side (a) and on the receiver side (b). It can be seen that there is no difference in the two cases. The launch power was kept low in this case to maintain a linear system.

In addition, the cross over point of the frequency modulated signal may be adjustable in order to achieve improved performance after the OSR 14, as described in U.S. patent application Ser. No. 10/933,081, which is hereby incorporated herein by reference. In some embodiments, the transmission function of the OSR 14 is such that it reduces the cross over point of its output. The output of the laser 12 may have a crossing point shifted up a corresponding amount such that the OSR 14 substantially reverses for the shift in the cross over point in the output of the laser 12. For example, the cross over point of the input frequency modulated signal from the laser 12 may be greater than 50% to compensate, such that the crossing point of the output of the OSR 14 will be approximately 50%.

Since the intensity modulation depth of optical signal before the OSR 14 is preferably very low in the illustrated embodiment, the input optical signal is a nearly continuous waveform (CW). Because SPM and XPM relate to intensity variation, they will have much less impact on this signal than a signal having greater intensity modulation. Since the impact of nonlinear effects is reduced greatly, the high dispersion tolerance of CML is preserved even after long distance transmission. Because the nonlinear degradation is reduced in embodiments of the invention, the launching power can be increased and the received optical signal-to-noise ratio (OSNR) can be improved accordingly. Higher OSNR can be realized using the disclosed system even as compared to an intensity modulated system. Furthermore, since the spectrum of the disclosed transmitter is only half of a standard non-return to zero (NRZ) signal, its tolerance to polarization mode dispersion (PMD) can also be improved.

Figure 6:
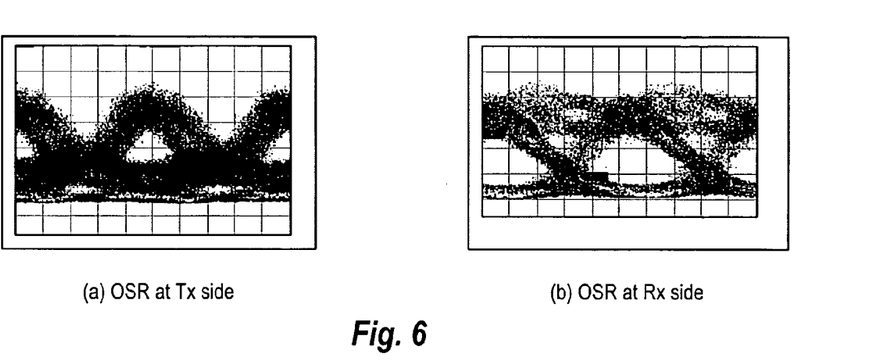
FIG. 6 is a data eye plot of signals generated in accordance with the embodiment of FIG. 4 that have experienced degradation due to nonlinear effects.

The OSR 14 in the embodiment of FIG. 4 can be used as both optical spectrum reshaper and a narrow band filter to suppress optical noise. Due to the narrow bandwidth of the OSR 14, it can improve OSNR performance of optical noise dominated systems. FIG. 6 shows the tolerance to SPM in two different configurations: (a) an eye diagram with the OSR 14 at the transmitter and (b) an eye diagram with the OSR 14 placed at the receiver after transmission. In this experiment, two spans of 100 km SMF fiber were used, having a total dispersion of 3400 ps/nm. The transmitted signal has a bit rate of 10 Gb/s. Input power to the first span is 12.5 dBm and to the second span is 13 dBm. A direct modulated laser 12 and an OSR 14 as described above were used in the experiment. It can be seen from FIG. 6 that with the OSR 14 at receiver side, the eye opens well at such high input power. However, with the OSR 14 at the transmitter side, the eye is completely closed at 200 km, which is caused by SPM and dispersion. The second approach (OSR 14 at the receiver) therefore provides higher tolerance to dispersion and SPM.

Figure 7:
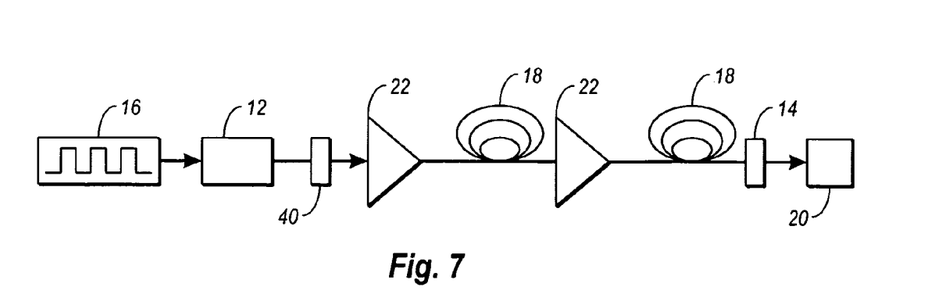
FIG. 7 is a schematic block diagram of another alternative embodiment of a laser transmitter in accordance with an embodiment of the present invention.

Referring to FIG. 7, in some embodiments wherein the OSR 14 is positioned between the fiber 18 and receiver 20, a second OSR 40 is positioned between the laser 12 and the fiber 18. In such embodiments, the OSR 40 may be either centered on the output of the laser or be offset therefrom. For example, the OSR 40 may have a transmission function having a transmission peak aligned with the one frequency of the frequency modulated output of the laser 12. In some embodiments, the OSR 40 has a transmission function effective to suppress transient chirp. Transient chirp can cause too much FM to AM conversion in a dispersion fiber, and may therefore reduce the tolerance of the system to nonlinear effects, particularly in WDM applications. In other embodiments, the OSR 40 also partially reshapes the signal, such as by increasing the extinction ratio between the one frequency and zero frequency portions of the frequency modulated signal.

Figure 8:
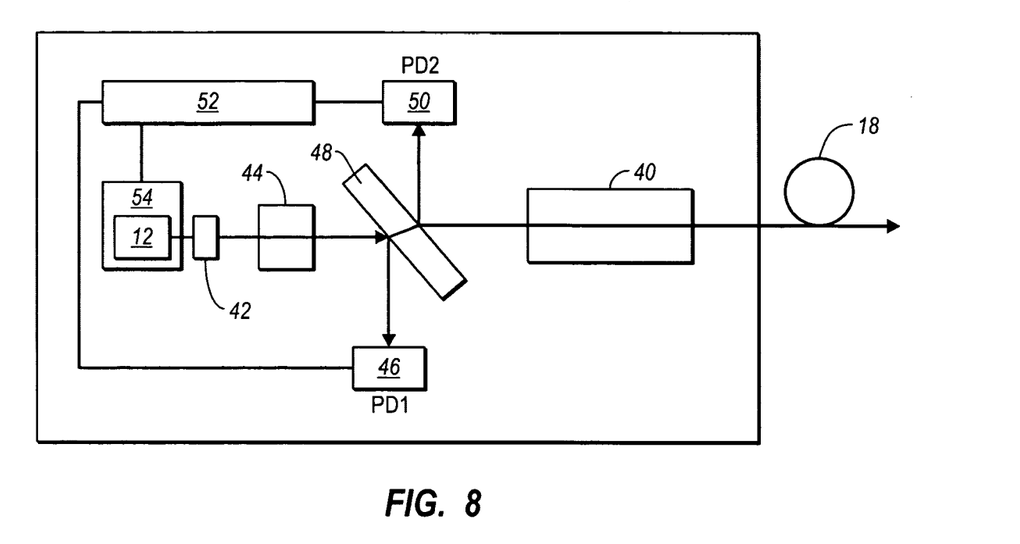
FIG. 8 is a schematic block diagram of a structure for locking the wavelength of a laser in accordance with an embodiment of the present invention.

Referring to FIG. 8, in some embodiments, the OSR 40 located between the laser 12 and the fiber 18 may be used to control the wavelength of the laser 12. For example, a collimating lens 42 is used to direct a collimated beam from the laser 12 through an isolator 44. A small fraction (typically 5%) of light from the laser is re-directed to a photodiode 46 by a tap beam splitter 48. The tap beam splitter 48 may be produced by depositing an anti-reflection coating on one side of a small piece of polished glass and a second controlled-reflection coating on the opposite side.

In one embodiment of the invention, the portion of the collimated beam passing through the beam splitter 48 is incident on the OSR 40. The spectral response of the OSR 40 may be similar to a Fabry-Perot cavity, in which non-transmitted light is reflected. Therefore, depending on the location of the lasing wavelength relative to the passband of the OSR 40, a portion of the incident optical beam will be transmitted while a residual portion of the incident beam is reflected. The reflected portion of the beam passes back through the tap beam splitter 48 and a portion of the power, such as about 5%, is diverted onto a second photodetector 50, as shown in FIG. 1.

In the transmitter of FIG. 7, it is important to maintain spectral alignment of the wavelength of the laser 12 with respect to the OSR 40. In operation, the laser 12 may be biased to generate a zero frequency signal and is modulated according to a data signal to generate adiabatically chirped pulses that include frequency excursions away from the zero frequency, such as up to a one frequency.

The frequency alignment between the laser 12 and the OSR 40 is generally implemented by a controller 52 that compares the average optical power before and after the OSR 40. For example, the ratio of the photo currents produced by photodetectors 48, 50 may be used to "lock" the relative spectral positions of the laser 12 with respect to the response of the OSR 40. During calibration, the optimal set point for the laser wavelength relative to the OSR spectral response is determined. During operation, the controller 52 then acts to maintain the laser wavelength at this calibrated set point by continuously adjusting the laser temperature via a thermoelectric cooler (TEC) 54 to which it is coupled in response to the currents produced by the photodetectors 48, 50. For example, if the lasing wavelength changes, the ratio of the photodiode signals provides an error signature allowing the controller 52 coupled to the TEC 54 to re-adjust the DFB temperature to maintain the correct wavelength.

Figure 9:
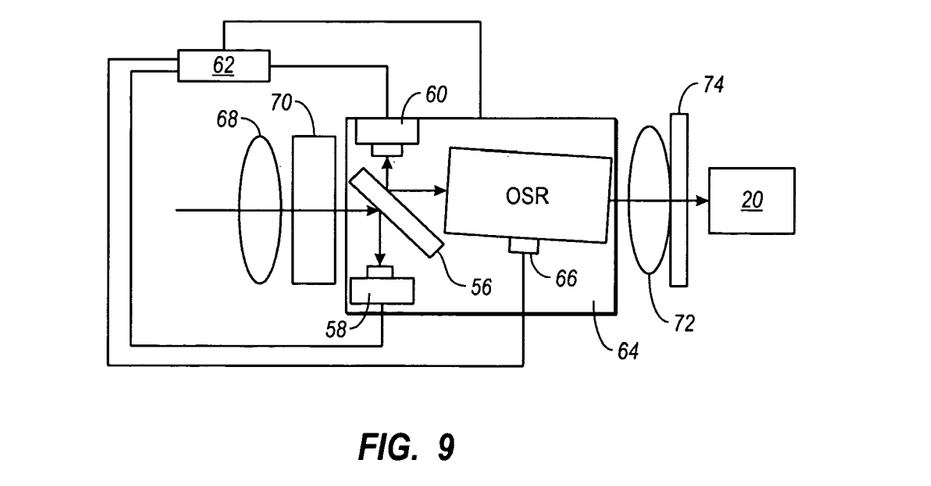
FIG. 9 is a schematic block diagram of a structure for locking the transmission function of an optical spectrum reshaper relative to an input signal in accordance with an embodiment of the present invention.

Referring to FIG. 9, in some embodiments the OSR 14 positioned between the fiber 18 and the receiver 20 tracks the operation wavelength of the laser 12, in order provide improved performance. Light output from the fiber 18 may be incident on a beam splitter 56. A portion of the light is diverted to a first photodiode 58 and the remainder is transmitted to the OSR 14. Light rejected by the OSR 14 is also incident on the beam splitter 56 and a portion thereof is diverted to a second photodiode 60. A controller 62 receives the outputs of the photodiodes 58, 60 and controls the temperature of the OSR 14 according to a ratio of the outputs by controlling power supplied to a thermoelectric cooler (TEC) 64 on which the OSR 14 is mounted. In an alternative embodiment, the second photodiode 60 may be positioned after the OSR 14 and measure the amount of light transmitted therethrough.

As the temperature of the OSR 14 is changed by the TEC 64, its transmission function will change, resulting in a corresponding change in the amount of transmitted and rejected light. The ratio of the outputs of the photodiodes 58, 60 will therefore also change. For example, for an OSR 14 made of Silica, a 1 degree temperature increase changes the center wavelength by 0.01 nm. By keeping the ratio of the photodiodes 58, 60 constant, the OSR 14 can track the laser wavelength and lock to a calibrated wavelength. To avoid wavelength drift, the temperature of the OSR may be held substantially constant by controlling power to the TEC 64. The controller 62 may receive an output from a temperature sensor 66 in thermal contact with the OSR 14 in order to maintain the OSR 14 at a constant precalibrated temperature.

In some embodiments, light from the fiber 18 passes through a collimating lens 68 and isolator 70 prior to passing through the tap beam splitter 56. A focusing lens 72 and window 74 may be positioned between the OSR 14 and the receiver 20.

Figure 10:
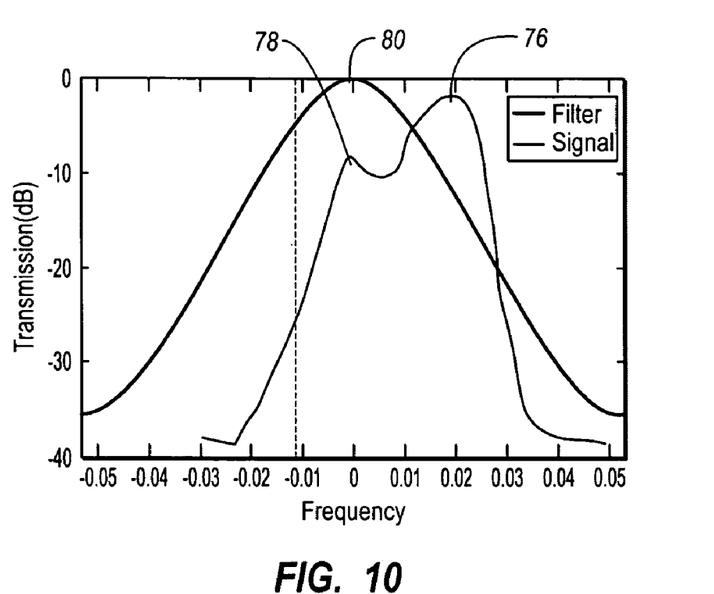
FIG. 10 is a plot of the transmission function of an optical spectrum reshaper relative to the spectrum of a frequency modulated signal in accordance with an embodiment of the present invention.

Referring to FIG. 10, in some embodiments, the OSR 40 positioned between the laser 12 and the fiber 18 may be used to reduce the amplitude of the one frequency portions of the frequency modulated output of the laser. As the laser current is modulated by a digital signal, both the frequency of the laser output and its intensity are modulated. Some amplitude modulation is unavoidable in this case because of the finite efficiency of the laser. The amplitude modulation is reduced in accordance with an embodiment of the invention to further increase tolerance to fiber nonlinearities such as SPM and XPM. In the present invention, a system and method is provided for further decreasing the residual amplitude modulation at the transmitter using the additional OSR 40 after the directly modulated laser 12 and before the transmission fiber 18, as shown in FIG. 7.

In the illustrated embodiment the laser 12 is modulated with a digital signal (NRZ or RZ) to have both amplitude and frequency modulation. The OSR 40 is spectrally aligned with the modulated spectrum of the DML to produce a filtered signal having reduced amplitude modulation. This may be achieved by shifting the center wavelength of the modulated spectrum of the laser 12 relative to the peak transmission frequency of the OSR 40. For a semiconductor laser, the digital one bits are typically blue shifted relative to the digital zero bits. This is because one bits correspond to a higher bias current of the DML and zero bits to a lower bias, as determined by the sign of the line width enhancement factor.

FIG. 10 shows an example of the relative spectral shift of the frequency modulated output of the laser 12 relative to the OSR 40. The spectrum is substantially identified by a one peak 76 and a zero peak 78, corresponding to the energy in the one and zero bits. The separation between the peaks 76, 78 is referred to as adiabatic chirp, which is determined by the amount of current modulation and the FM efficiency of the laser 12. In order to reduce the amplitude modulation the spectrum is shifted such that the one frequency is located on the high frequency side of the transmission peak 80 of the OSR 40. The amplitude of the one frequency portions will therefore experience greater attenuation when transmitted through the OSR 14 than the zero frequency.

Figure 11:
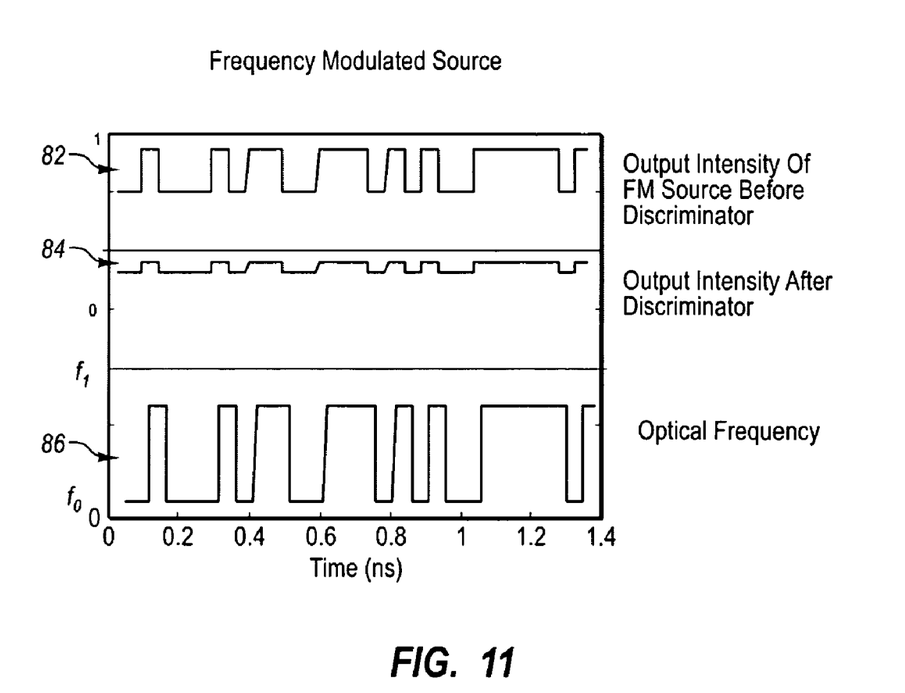
FIG. 11 is a plot of signals at different stages within a transmitter in accordance with an embodiment of the present invention.

As shown in FIG. 11, the frequency modulated output 82 of the laser 12 has amplitude modulation for which the one bits have a higher amplitude and are blue shifted, while the zero bits have a lower amplitude and are red shifted. This difference in energy of one and zero bits is reflected in the two-peaked optical spectrum (FIG. 10), in which the blue shifted (one peak) has higher energy than the red shifted (zero peak). When the spectrum is shifted relative to the transmission function of the OSR 40 such that the one peak is on the high frequency side of the transmission function, the OSR 40 reduces the one peak relative to the zero peak, such that their amplitudes are nearly the same, such as within 10%, preferably within 5% of the zero peak amplitude, as shown by the output 84 of the OSR 40.

Following transmission over the fiber 18, the output 84 passes through OSR 14 positioned between the fiber 18 and the receiver 20. The output 86 of the OSR 14, which is incident on the receiver 20, has enhanced amplitude modulation in which the one bits have substantially higher amplitude than the zero bits. This may be accomplished by the OSR 14 having a transmission function that attenuates the zero bits, or zero frequency, greater than the one bits, or one frequency.

In a preferred embodiment, the one frequency peak 76 and zero frequency peak 78 of the frequency modulated output of the laser 12 lie on a negative sloped transmission edge of the OSR 40. Alternatively, a negative transmission edge is positioned between the one frequency peak 76 and zero frequency peak 78. The OSR 14 preferably has a positive sloped transmission edge located between the one frequency peak 76 and the zero frequency peak 78. Alternatively, the one frequency peak 76 and zero frequency peak 78 lie on the positive sloped transmission edge.

In a preferred embodiment, the positive sloped transmission edge of the OSR 14 has greater slope, such as more than double, preferably more than triple, the slope of the negative sloped transmission edge of the OSR 40. For example, the OSR 40 may have a transmission function effective to attenuate the one frequency between 0.1 and 3 dB, preferably between 0.5 and 2 dB more than the zero frequency, whereas the OSR 14 has a transmission effective to attenuate the zero frequency between 5 and 10 dB, preferably greater than 10 dB, more than the one frequency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter comprising:
 a digital data source;
 a laser electrically coupled to the digital data source and configured to output a frequency modulated signal encoding an output of the digital data source;
 an optical spectrum reshaper positioned to receive the frequency modulated signal and having a transmission function effective to convert the frequency modulated signal to a filtered signal having lower bandwidth and higher amplitude modulation than the frequency modulated signal;
 an optical receiver;
 an optical fiber channel having a first end positioned to receive the filtered signal and a second end proximate the receiver; and
 a filter positioned between the second end and the receiver, the filter having a peak transmission frequency thereof located on a transmission edge of the optical spectrum reshaper.

2. The optical transmitter of claim 1, wherein the peak transmission frequency of the filter is located proximate a peak logarithmic derivative value of the transmission function of the optical spectrum reshaper.

3. The optical transmitter of claim 1, wherein the filter has a bandwidth equal or less than a bit rate of the output of the digital data source.

4. The optical transmitter of claim 1, wherein the output of the digital data source includes a return to zero (RZ) signal.

5. The optical transmitter of claim 1, wherein the frequency modulated signal includes frequency excursions from a base frequency to a peak frequency; and wherein the product of a difference between the base frequency and the peak frequency and a zero bit duration of the output of the digital data source is equal to an odd integer multiple of a value between $0.5\pi$ and $1.5\pi$.

6. An optical transmitter comprising:
a digital data source;
a laser electrically coupled to the digital data source and configured to output a frequency modulated signal encoding an output of the digital data source, the frequency modulated signal including high frequency portions and low frequency portions encoding data symbols, the high frequency portions having higher amplitude than the low frequency portions;
a first optical spectrum reshaper positioned to receive the frequency modulated signal and configure to output a filtered signal, the first optical spectrum reshaper having a transmission function effective to attenuate the high frequency portions more than the low frequency portions;
an optical receiver;
an optical fiber having a first end positioned to receive the filtered signal and a second end proximate the optical receiver; and
a second optical spectrum reshaper positioned optically between the second end and the receiver and having a transmission function effective to attenuate the low frequency portions more than the high frequency portions.

7. The optical transmitter of claim 6, wherein the transmission function of the first optical spectrum reshaper is effective to attenuate the high frequency portions relative to the low frequency portions such that an amplitude of the high frequency portions is not less than that of the low frequency portions.

8. The optical transmitter of claim 1, wherein the transmission function of the first optical spectrum reshaper is effective to attenuate the high frequency portions between 0.5 and 2 dB more than the low frequency portions.

9. The optical transmitter of claim 8, wherein the transmission function of the second optical spectrum reshaper is effective to attenuate the low frequency portions between 5 and 10 dB more than the high frequency portions.

10. The optical transmitter of claim 6, wherein the first optical spectrum reshaper has a transmission function having a negative slope portion located between spectral positions of the low frequency portions and high frequency portions.

11. The optical transmitter of claim 10, wherein the second optical spectrum reshaper has a transmission function having a positive slope portion located between the spectral positions of the low frequency portions and high frequency portions.

12. The optical transmitter of claim 11, wherein an absolute value of the slope of the positive slope portion is greater than that of the negative slope portion.

13. The optical transmitter of claim 12, wherein the absolute value of the slope of the positive slope transmission edge is more than two times that of the negative transmission edge.

14. The optical transmitter of claim 6, further comprising:
a tap splitter positioned between the second end of the optical fiber and the second optical spectrum reshaper and oriented to deflect a portion of an output of the optical fiber and to deflect a portion of rejected light from the second optical spectrum reshaper;
a first photodiode positioned to receive the deflected portion of the output of the optical fiber;
a second photodiode positioned to receive the deflected portion of rejected light from the second optical spectrum reshaper;
a temperature modulating element positioned in thermal contact with the second optical spectrum reshaper; and
a controller coupled to the first and second photodiodes and to the temperature modulating element, the controller configured to control power supplied to the temperature modulating element to drive a ratio of outputs of the first and second photodiodes toward a predetermined value.

15. A method for transmitting data symbols comprising:
modulating a laser to output a frequency modulated signal encoding the data symbols, the frequency modulated signal including high frequency portions and low frequency portions encoding the data symbols, the high frequency portions having higher amplitude than the low frequency portions;
transmitting the frequency modulated signal through a first optical spectrum reshaper, the optical spectrum reshaper having a transmission function effective to attenuate the high frequency portions more than the low frequency portions;
transmitting an output of the optical spectrum reshaper through an optical fiber having a first end positioned to receive the filtered signal and a second end proximate an optical receiver;
transmitting an output of the second end of the optical fiber through a second optical spectrum reshaper positioned optically between the second end and the receiver and having a transmission function effective to attenuate the low frequency portions more than the high frequency portions; and
detecting an output of the second optical spectrum reshaper at an optical receiver.

16. The method of claim 15, wherein the transmission function of the first optical spectrum reshaper is effective to attenuate the high frequency portions relative to the low frequency portions such that an amplitude of the high frequency portions is not less than that of the low frequency portions.

17. The method of claim 15, wherein the transmission function of the first optical spectrum reshaper is effective to attenuate the high frequency portions between 0.5 and 2 dB more than the low frequency portions.

18. The method of claim 15, wherein the transmission function of the second optical spectrum reshaper is effective to attenuate the low frequency portions between 5 and 10 dB more than the low frequency portions.

19. The optical transmitter of claim 15, wherein the first optical spectrum reshaper has a transmission function having a negative slope transmission edge located between spectral positions of the low frequency portions and high frequency portions.

20. The optical transmitter of claim 19, wherein the second optical spectrum reshaper has a transmission function having a positive slope transmission edge located between the spectral positions of the low frequency portions and high frequency portions; and wherein an absolute value of the slope of the positive slope transmission edge is greater than that of the negative transmission edge.

* * * * *